Jan. 3, 1950        H. ZIEBOLZ        2,493,180
DIFFERENTIAL PRESSURE RESPONSIVE MEANS
Filed Oct. 3, 1946        2 Sheets-Sheet 2
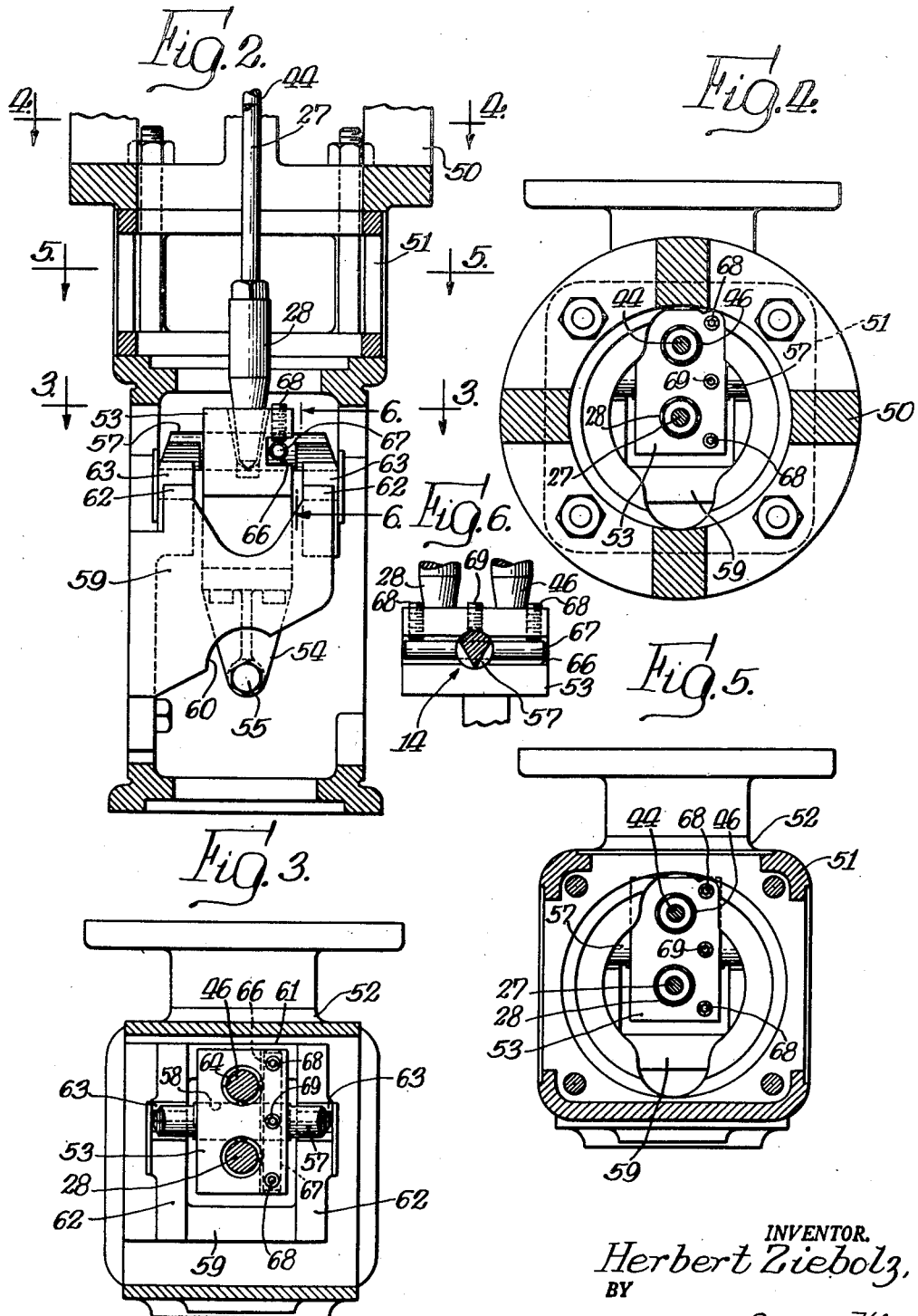
INVENTOR.
Herbert Ziebolz
BY
Chritton, Schroeder, Merriam & Hofgren
Attys.

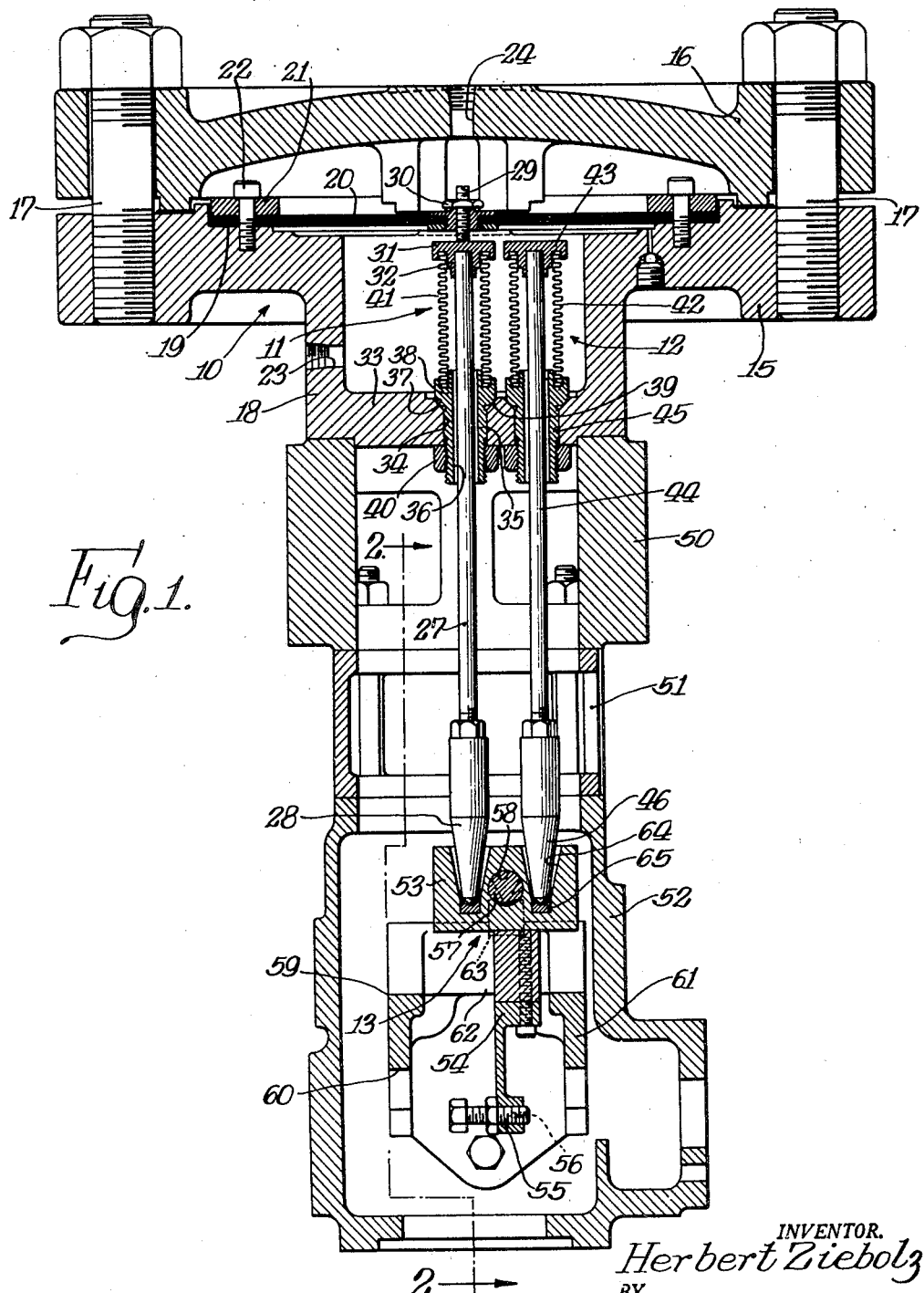

Patented Jan. 3, 1950

2,493,180

UNITED STATES PATENT OFFICE 2,493,180

DIFFERENTIAL PRESSURE RESPONSIVE MEANS

Herbert Ziebolz, Chicago, Ill., assignor to Askania Regulator Company, Chicago, Ill., a corporation of Illinois Application October 3, 1946, Serial No. 700,887

9 Claims. (Cl. 137—157)

1

The invention relates generally to differential pressure responsive means and, more particularly, to such means adapted for use where high static pressures are present.

Where high static pressures are present, a conventional seal or packing of the stuffing box type for the rod or stem transmitting the movement of the diaphragm of the pressure responsive means to the outside of the casing thereof is not capable of containing these high pressures and it becomes necessary to employ a positive-seal, flexible-wall type means such as a bellows. Employing a single bellows subjected to the pressure on one side of the diaphragm, of course, introduces an additional force acting on the rod, due to the static rather than to the differential pressure. This has in the past been attempted to be overcome by the employment of a second bellows mounted on the same axis with the first and acting in opposition to the first, these bellows being normally disposed on opposite sides of the diaphragm of the pressure responsive means. The difficulty with this attempted solution, however, is the fact that it is substantially impossible to have two bellows of precisely the same area. Thus with different pressure areas there is still an unbalanced force, due to the static pressure rather than to the differential pressure, and where the static pressure varies through a considerable range the error thus introduced is very material and also variable.

It is an object of this invention, therefore, to provide a new and improved differential pressure responsive means having positive-seal, flexible-wall type means for sealing the same for use with high static pressures, in which the effect of such static pressure on the sealing means is substantially completely eliminated despite wide variations in the static pressure.

Another object is to provide differential pressure responsive means having a positive, flexible-wall seal for the diaphragm movement transmitting rod, in which the effect of static pressure on the seal is offset by another pressure responsive means associated with the seal in such manner that differences in pressure areas between the two may readily be compensated for.

A further object is to provide a differential pressure responsive means, with a bellows seal for the diaphragm movement transmitting rod, having a second such bellows subjected to static pressure only, a lever intended to reflect movements of the rod caused only by deflection of the diaphragm under differential pressures, the bellows acting in opposition on the lever, and

2 means for readily varying the respective lever arms at which the bellows act to facilitate balancing of the forces created by static pressure.

Other objects and advantages will become apparent from the following detailed description taken in connection with the accompanying drawings, in which:

Fig. 1 is a diametrical sectional view of a differential pressure responsive means embodying the features of this invention.

Fig. 2 is a sectional view taken approximately along the line 2—2 of Fig. 1 showing a portion of the differential pressure responsive means.

Fig. 3 is a transverse sectional view taken approximately along the line 3—3 of Fig. 2.

Fig. 4 is a view similar to Fig. 3 but taken along the line 4—4 of Fig. 2.

Fig. 5 is a view similar to Fig. 3 but taken along the line 5—5 of Fig. 2.

Fig. 6 is a fragmentary view taken along the line 6—6 of Fig. 2.

While the invention is susceptible of various modifications and alternative constructions, it is shown in the drawings and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

In the exemplary embodiment herein disclosed, the invention comprises generally means 10 responsive to differential pressures, means 11 forming a positive seal for the passage of the motion transmitting means of the differential pressure means, a static pressure compensating or offsetting means 12, a lever 13 for reflecting the differential pressures, and adjusting means 14 (see Fig. 6) for readily equalizing at the lever the static pressure effect on the sealing means 11 and the compensating means 12. More particularly, the differential pressure responsive means 10 is of the diaphragm type and thus comprises a housing having a main part 15 and a complementary part 16, the two parts being adapted to be securely and tightly assembled by means of a plurality of bolts 17. The main part 15 has at the center thereof a cup-like, axial extension 18 projecting in a direction away from the closure part 16, that is, downwardly, as viewed in Fig. 1. On its inner face the main part 15 is formed with an annular, slightly depressed surface 19 for the reception of the periphery of a flexible diaphragm 20. The diaphragm is tightly clamped onto the part 15 by means of an annular ring 21 and a plurality of bolts 22 which pass through the ring and the diaphragm and are threaded into the main part 15. Formed in the main part 15 to open to one side of the diaphragm 20 is a threaded port 23, and formed in the complementary part 16 to open to the opposite side of the diaphragm 20 is a similar threaded port 24. It will be understood that the ports 23 and 24 will have connected thereto conduits or other means for conducting to the means 10 the differential pressure which is to be measured or responded to.

Movement of the diaphragm 20 is transmitted to the lever 13 through the medium of a rod 27 which terminates at the lever end in a tapered bearing tip adjustable to a limited degree longitudinally of the rod. At its opposite end, the upper end as viewed in Fig. 1, the rod 27 is adjustably attached to the center of the diaphragm 20. The adjustable attachment of the rod to the diaphragm includes a screw 29, a nut 30 and a cap 31 having an interior cylindrical portion 32 in which the rod 27 is received with a snug fit. The rod 27 to extend outwardly of the cup-like portion 18 of the main part 15 must pass through the end wall 33 of the cup-shaped portion. To that end, the end wall 33 is provided with an opening 34 in which is received an elongated nipple 35 having a bore 36 therein which is larger than the rod 27 so as to permit free axial movement of the rod through the nipple. At its inner end, the hole 34 is beveled to form an outwardly flaring, frusto-conical surface 37. The inner end of the sleeve 35 is enlarged to form a head 38 and this head is formed with a radius 39 adapted to engage the frusto-conical surface to form a seal effective to withstand high pressures. The outer end of the nipple is threaded to receive a nut 40 for drawing the radius of the head very tightly against the frusto-conical surface 37.

As already stated, a positive sealing means 11 is provided for the passage of the rod through the housing of the pressure responsive means. This positive seal herein takes the form of a flexible-wall means, more particularly, a bellows 41. One end of the bellows is securely clamped in the cap 31 while the other end is securely clamped in the inner or head end of the sleeve 35. As clearly seen in Fig. 1, the cap and the head end of the sleeve 35 are formed with annular, axially opening channels in which the ends of the bellows 41 are received and then clamped in pressure-tight couplings, aided by soldering or otherwise sealing.

It is clearly apparent to those skilled in the art that the bellows 41 is subject to and responsive to the static pressure in the chamber within the cup-shaped portion 18. Thus, the effect on the rod 27 is the combined effect of the differential pressure acting on the diaphragm 20 and the static pressure acting on the bellows 41, and movement of the rod 27 does not represent the static pressure differential. The means 12 is provided herein for offsetting or counteracting this effect of static pressure on the bellows 41. To that end, there is provided in the same chamber with the bellows 41 a second bellows 42 which is selected to be as nearly identical with the bellows 41 as possible. Like the bellows 41, the bellows 42 has a cap 43 at one end which is snugly mounted upon one end of a second rod 44 extending parallel but in slightly spaced relation to the rod 27. The rod 44 passes freely through a second nipple 45 identical with the nipple 35, with the bellows 42 secured at its ends in the cap 43 and the inner end of the nipple 45. The rod 44 again terminates in a tapered bearing tip 46 similar to the tip 28.

The lever 13 is mounted within the lowermost, as viewed in Fig. 1, of three frame sections 50, 51 and 52 secured in suitable manner to one another and also dependingly secured to the main part 15 of the differential pressure means 10. The lever comprises a block 53 from which depends an extension 54 rigid therewith and carrying at its free end an adjustable bolt 55 formed with an axial socket 56 for the reception of the bearing end of one element of a linkage system. The lever 13 is adapted to pivot in the plane of Fig. 1 and is herein given a unique mounting in order that both the pressure differential means 10, the positive seal 11 and the static pressure compensating means 12 may, through their respective rods 27 and 44, act thereon to result in pivoting of the lever in accordance with variations in the differential pressure only. To that end, the block 53 is rockably supported through the medium of an element 57 giving knife-edge support. The element 57 has a cylindrical, intermediate portion and is rotatably received in a bore 58 formed in the block 53 and extending at right angles to a plane through the rods 27 and 44. The ends of the element 57 project beyond the block 53 and have a sector-like transverse cross section with the apex of the sector-like ends lying in the circumference of the element.

The element 57 is cradled in a bracket 59 (see Figs. 1 and 2) projecting from one wall of the section 52 and having a pair of braces 60 and 61. Joining the braces are cross members 62 each carrying a hardened insert 63. Each insert 63 is slightly recessed in its top surface to receive the apex edge of the sector-like ends of the element 57. Formed in the block 53 to either side of the bore 58 are a pair of tapering sockets 64 for the reception of the bearing tips 28 and 46. At the bottom of each socket 64 there is preferably positioned a small hardened insert 65 having a conical recess in the exposed surface for cooperation with the bearing tips 28 and 46.

While the sockets 64 are fixed relative to the bore 58, means is herein provided which in effect changes the respective movement arm at which the rods 27 and 44 act on the block 53 and thus changes the effect which the bellows 41 or 42 have on the lever. This is herein accomplished by rotary adjustment of the element 57 within the bore in the block 53. To that end, the block has formed therein a passage, herein a channel 66 extending transversely of the bore 58 and intersecting the bore. Disposed within this channel is a pin 67 extending transversely through and having a tight fit within the element 57. The pin 67 has a diameter smaller than the dimension of the channel in the plane transverse to the bore 58 and the element 57 in order that the pin 67 may have limited pivoting movement, that is, rotational movement of the element 57. In order to effect the required adjustments of the element 57 a pair of set screws 68 is provided. These are threaded in the block 53 and project into the channel 66 for engagement with the pin 67 near the ends thereof. Intermediate the screws 68 the block 53 carries a third set screw 69 which projects into the bore 58 for engagement with the element 57 to aid in locking the element in adjusted position.

It is believed readily apparent from the foregoing that the bellows 41 and 42 can, through the medium of the moment arm adjusting means just described be caused to have the same effect on the lever 13 and that, as a result, the effect of static pressure on the bellows 41 can be completely and effectively counteracted and offset by the bellows 42 so that the movement imparted to the lever 13 will be truly and only that produced by the differential pressures. This is true not only for one value of static pressure but is also true over a wide variation of the static pressure to which the bellows are subjected. As above pointed out, the invention herein disclosed is believed to be the first solution to the problem of providing a differential pressure responsive means subjected to high static pressures which assures a complete balancing or offsetting of the static pressure over a wide range of static pressures. With all the construction is rugged, simple and should require very little in the way of maintenance or readjustment once properly adjusted to eliminate the effect of static pressures.

I claim as my invention:

1. A differential pressure responsive device comprising a housing, a flexible diaphragm mounted within said housing dividing the same into two pressure chambers, a rod secured at one end to said diaphragm and projecting at the other end outwardly of said housing, a flexible-wall means for positively sealing the passage of said rod through said housing secured at one end to said housing in surrounding relation to the passage for the rod and at the other end to said rod, a lever mounted to be actuated by said rod in response to differential pressures acting on said diaphragm, means responsive to static pressure and subjected to the same static pressure as said sealing means acting in opposition to the tendency of the static pressure acting on said sealing means to rotate said lever, and means for equalizing the effects of said sealing means and said last named means on said lever to eliminate the effect of static pressure on said sealing means.

2. A differential pressure responsive device comprising a housing, a flexible diaphragm mounted within said housing dividing the same into two pressure chambers, a rod secured at one end to said diaphragm and projecting at the other end outwardly of said housing, flexible-wall means for positively sealing the passage of said rod through said housing secured at one end to said housing in surrounding relation to the passage for the rod and at the other end to said rod, a lever mounted to be actuated by said rod in response to differential pressures acting on said diaphragm, means responsive to static pressure and subjected to the same static pressure as said sealing means acting on said lever in opposition to the tendency of the static pressure acting on said sealing means to rotate said lever, and means for equalizing the effects of said sealing means and said last named means on said lever.

3. A differential pressure responsive device comprising a housing, a flexible diaphragm mounted within said housing dividing the same into two pressure chambers, a rod secured at one end to said diaphragm and projecting at the other end outwardly of said housing, a bellows secured at one end to said rod and at the other end to said housing in surrounding relation to said rod within one chamber to seal the passage of said rod through said housing, a lever mounted to be actuated by said rod in response to differential pressures acting on said diaphragm, a second bellows exposed to the pressure in said one chamber only and acting on said lever in opposition to said first named bellows, and means for adjusting the moment arms at which said bellows act on said lever.

4. A differential pressure responsive device comprising a housing, a flexible diaphragm mounted within said housing dividing the same into two pressure chambers, a rod secured at one end to said diaphragm and projecting at the other end outwardly of said housing, a bellows secured at one end to said rod and at the other end to said housing in surrounding relation to said rod to seal the passage of said rod through said housing, a lever, a pivot for said lever, said rod engaging said lever to one side of said pivot, a second bellows disposed in the same chamber as said first named bellows, a rod actuated by said second bellows engaging said lever on the side of its pivot opposite said first named rod, and means for adjusting the pivot of said lever to adjust the relative length of the moment arms at which said rods act on said lever.

5. A differential pressure responsive device comprising a housing, a flexible diaphagm mounted within said housing dividing the same into two pressure chambers, a rod secured at one end to said diaphragm and projecting at the other end outwardly of said housing, a bellows secured at one end to said rod and at the other end to said housing in surrounding relation to said rod to seal the passage of said rod through said housing, a second bellows disposed in the same chamber as said first named bellows, a rod actuated by said second bellows extending outwardly of the chamber parallel with said first named rod, a lever having a bore therethrough transversely of the plane in which the lever is to swing, a pivot for said lever comprising an element having a rotatable fit in the bore and extending to both sides of said lever, the projecting ends of said element being wedge-shaped, a supporting cradle for said element suspending said lever in position to be engaged by said rods one on each side of the bore, and means for determining the angular position of said element in the bore.

6. A differential pressure responsive device comprising a housing, a flexible diaphragm mounted within said housing dividing the same into two pressure chambers, a rod secured at one end to said diaphragm and projecting at the other end outwardly of said housing, a bellows secured at one end to said rod and at the other end to said housing in surrounding relation to said rod to seal the passage of said rod through said housing, a second bellows disposed in the same chamber as said first named bellows, a rod actuated by said second bellows extending outwardly of the chamber parallel with said first named rod, a lever having a bore therethrough transversely of the plane in which the lever is to swing, a pivot for said lever comprising an element having a rotatable fit in the bore and extending to both sides of said lever, the ends of said element having a sector-like transverse cross section, a cradle for rockably receiving the apex edge of the ends of said element for supporting said lever in position to be engaged by said rods one on each side of the bore, and adjustable means for determining the angular position of said element in the bore to vary the moment arms at which said rods act on said lever.

7. A differential pressure responsive device comprising a housing, a flexible diaphragm mounted within said housing dividing the same into two pressure chambers, a rod secured at one end to said diaphragm and projecting at the other end outwardly of said housing, a bellows secured at one end to said rod and at the other end to said housing in surrounding relation to said rod to seal the passage of said rod through said housing, a second bellows disposed in the same chamber as said first named bellows, a rod actuated by said second bellows extending outwardly of the chamber parallel with said first named rod, a lever having a bore therethrough transversely of the plane in which the lever is to swing, a pivot for said lever comprising an element having a rotatable fit in the bore and extending to both sides of said lever, the ends of said element having a sector-like transverse cross section, a cradle for rockably receiving the apex edge of the ends of said element for supporting said lever in position to be engaged by said rods one on each side of the bore, and adjustable means for determining the angular position of said element in the bore to vary the moment arms at which said rods act on said lever comprising lateral projections on said element and adjustable means engaging said projections.

8. A differential pressure responsive device comprising a housing, a flexible diaphragm mounted within said housing dividing the same into two pressure chambers, a rod secured at one end to said diaphragm and projecting at the other end outwardly of said housing, a bellows secured at one end to said rod and at the other end to said housing in surrounding relation to said rod to seal the passage of said rod through said housing, a second bellows disposed in the same chamber as said first named bellows, a rod actuated by said second bellows extending outwardly of the chamber parallel with said first named rod, a lever having a bore therethrough transversely of the plane in which the lever is to swing, a pivot for said lever comprising an element having a rotatable fit in the bore and extending to both sides of said lever, the ends of said element having a sector-like transverse cross section, a cradle for rockably receiving the apex edge of the ends of said element for supporting said lever in position to be engaged by said rods one on each side of the bore, said lever having a passage extending at right angles to and intersecting the bore therein, a pin extending transversely through said element and along said passage, said passage being wider than said pin to permit limited rotation of said element, and a pair of set screws each engaging said pin near one end thereof.

9. A differential pressure responsive device comprising a housing, flexible means mounted within said housing dividing the same into two pressure chambers, movement transmitting means secured at one end to said flexible means and projecting outwardly of said housing for transmitting the movement of said flexible means, flexible-wall means for positively sealing the passage of said movement transmitting means through said housing secured to said housing and to said movement transmitting means, a lever mounted to be actuated in response to differential pressures acting on said flexible means, and means responsive to static pressure subjected to the same static pressure as said flexible-wall means and connected into the device to be operable to nullify the effect of static pressure on said flexible wall means.

HERBERT ZIEBOLZ.

No references cited.